(12) United States Patent
Yen

(10) Patent No.: US 6,552,493 B2
(45) Date of Patent: Apr. 22, 2003

(54) HIGH-LOW BEAM SWITCHING DEVICE FOR A HEADLIGHT

(76) Inventor: Kuo-Pin Yen, PO Box 82-144, Taipei (TW)

( * ) Notice: Subject to any disclaimer, the term of this patent is extended or adjusted under 35 U.S.C. 154(b) by 40 days.

(21) Appl. No.: 09/931,747

(22) Filed: Aug. 20, 2001

(65) Prior Publication Data

US 2003/0034739 A1 Feb. 20, 2003

(51) Int. Cl.[7] ................................................. H02J 1/00
(52) U.S. Cl. ......................................... 315/82; 315/58
(58) Field of Search .............................. 315/82, 58, 57, 315/56; H02J 1/00

(56) References Cited

U.S. PATENT DOCUMENTS

| | | | | | |
|---|---|---|---|---|---|
| 5,272,416 A | * | 12/1993 | Deems | ........................ | 315/82 |
| 5,900,698 A | * | 5/1999 | Fast | ............................ | 315/82 |
| 6,300,718 B1 | * | 10/2001 | Taniuchi et al. | .............. | 315/82 |

* cited by examiner

Primary Examiner—Hoanganh Le

(57) ABSTRACT

A high-low beam switching device for a headlight includes a housing, a base cap and an external layer constituted of a connection tube, and a seat body for the positioning of the inner layer of the solenoid module of a magnetic coil loop, and for the positioning of the sliding light tube support seat and the inner layer sliding structure of the tube. The solenoid module is provided with a through hole containing a securing seat and a sliding rod, and the outer ring of the sliding rod is provided with an elastic body and is in combination with the sliding-light tube support seat. The solenoid module produces a magnetic field to attract the sliding rod and the securing seat to form as one unit and the sliding tube seat drives the tube to move backward a distance of 7 mm, and when there is no magnetic field, the elastic body causes the sliding tube seat and the tube to restore to the original position, therefore, the focus of the single light point is changed to achieve the switching of near-far beam of the headlight.

4 Claims, 7 Drawing Sheets

HIGH-LOW BEAM SWITCHING DEVICE FOR A HEADLIGHT

BACKGROUND OF THE INVENTION (a) Field of the Invention

The present invention relates to the technology of high-low beam switching device for a headlight, and in particular, to a high-low beam switching device structure for the headlight of the car by employing the method of changing the focus of the moving light point.

(b) Description of the Prior Art

In conventional headlight of a car, a bi-tingsten light bulb (dual light points) is used to provide high-low beam effect of the headlight to change the focal distance of the light point, which is shown in FIG. 1. In view of the technology advancement, brighter, new single light point light bulb has been exploited to replace the conventional tungsten light bulb.

Recently, xenon light bulb having a single light point is widely used instead of using tungsten light bulb, but the xenon bulb only provides with a greater brightness and the bulb may not be able to replace the tungsten light bulb. Accordingly, it is an object to provide a high-low beam switching device for a headlight utilized a single light point light bulb to allow switching of high-low beam in accordance with the condition of the environment.

SUMMARY OF THE INVENTION

Accordingly, it is an object of the present invention to provide a high-low beam switching device for the headlight of a car, which mitigates the drawbacks of the conventional device.

Yet another object of the present invention is to provide a high-low beam switching device for a headlight, wherein a solenoid module is employed to produce a magnetic field effect to attract the sliding rod and the securing seat to form as one unit, and the sliding light tube seat drives the light tube to move backward for a distance of 7 mm, and when there is no magnetic field, the elastic body causes the sliding light tube seat and the light tube to restore to the original position, therefore, the focus of the single light point is changed to achieve the switching of high-low beam of the headlight.

An aspect of the present invention is to provide a high-low beam switching device for a headlight comprising a housing having a pivotal section at one end and a semi-cylindrical wire hole at the surface of the lower edge circumferential edge surface thereof, and having the other end being provided with a base cap seal having a wire-binding hole; a seat body being a U-shaped structure for the engagement with a solenoid module of a magnetic coil loop; the solenoid module being a wired wheel having a center hole and the edge thereof being surrounded with wires, the interior of the center hole being a securing seat and a sliding rod, and the external side of the end edge being mounted with a pad, and the external of the sliding rod being provided with an elastic body, and a blocking plate being mounted onto a conic end thereof; a connection tube seat having a connection section at one end and an engaging section at the other end, and the inner wall therefore being a protruded rib; a sliding light tube support seat being a circular body having a sliding slot provided around the circumferential edge thereof; a light tube having a single light point therein, wherein a high and a low lead wire are extended from the light point; and a combination seat having a plurality of combination wings at the circumferential edge of the center through hole thereof; and the surface of the wing being provided with a plurality of combination holes to secure with the light bulb seat for a car.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PRESENT INVENTION

Figure 1:
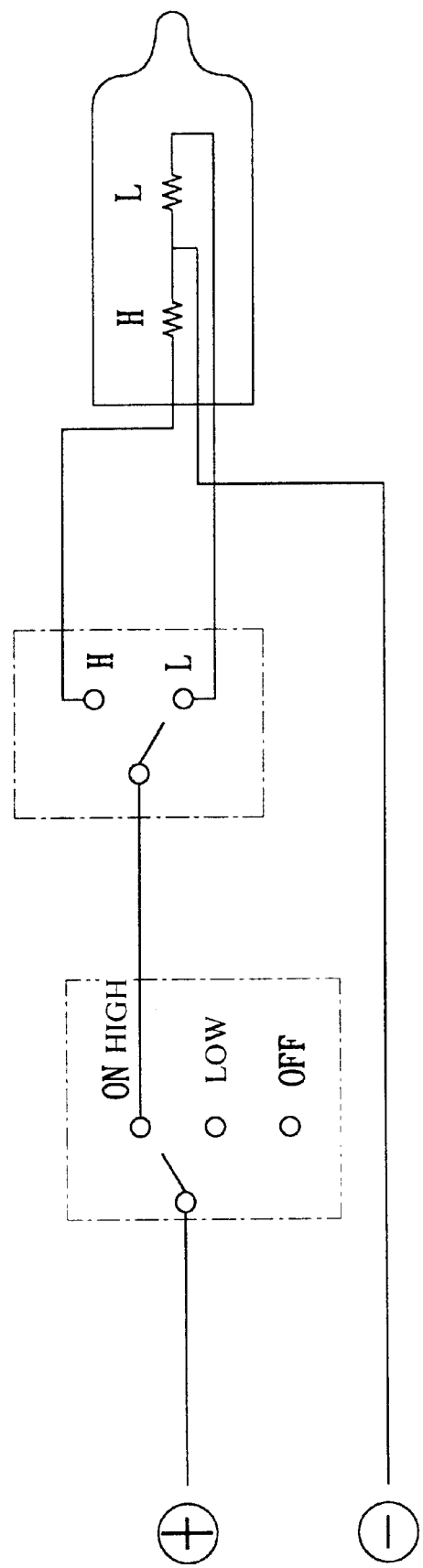
FIG. 1 is a circuit diagram for conventional halogen light bulb.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, alterations and further modifications in the illustrated device, and further applications of the principles of the invention as illustrated herein being contemplated as would normally occur to one skilled in the art to which the invention relates.

Figure 2:
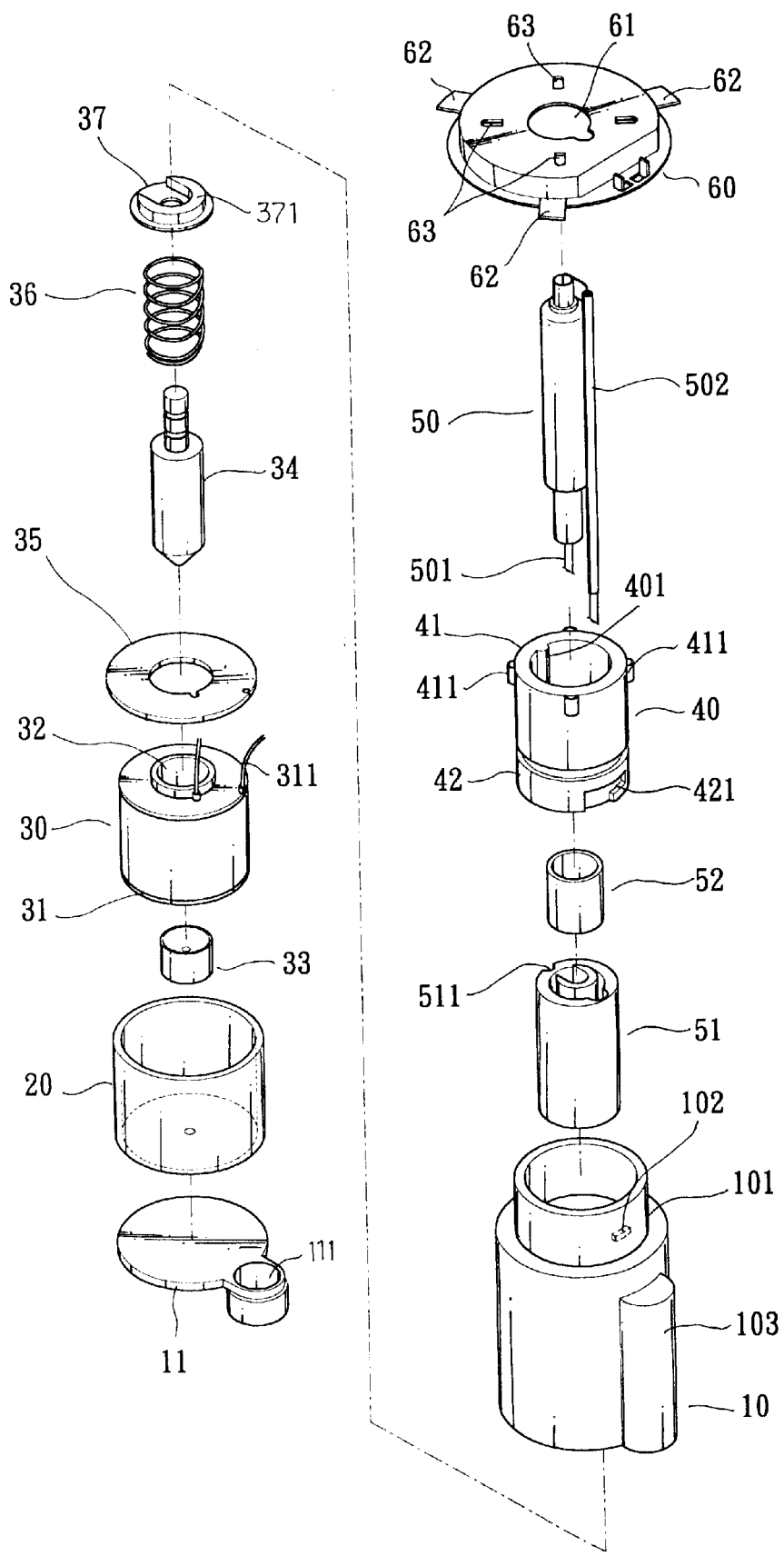
FIG. 2 is an exploded perspective view in accordance with the present invention.
Figure 3:
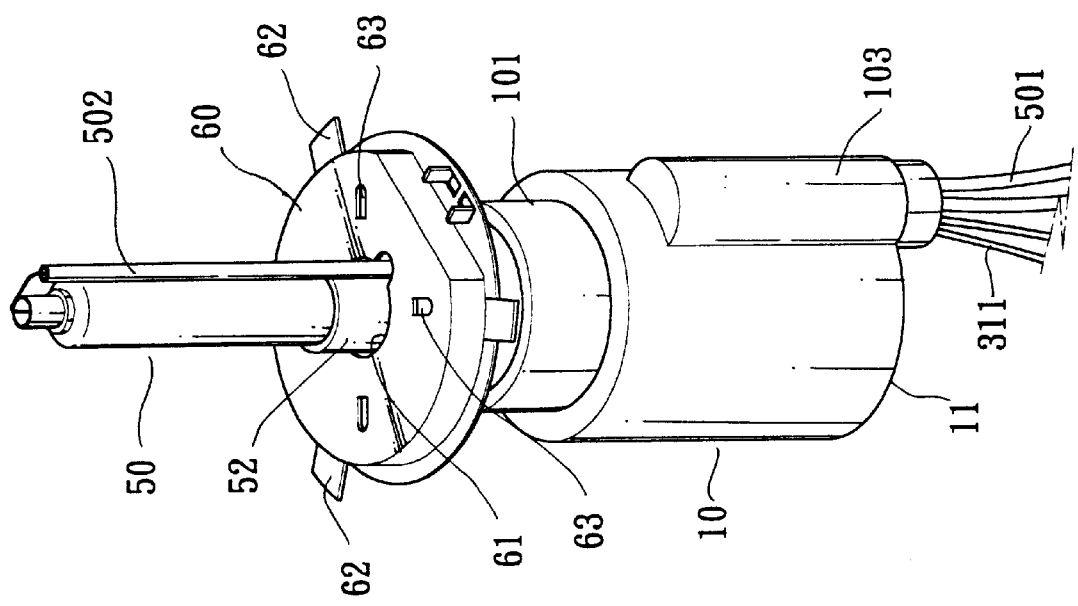
FIG. 3 is a perspective view of the present invention.

Referring to FIGS. 2 and 3, there is shown a high-low beam switching device for a headlight comprising a housing 10, a seat body 20, a solenoid module 30, a light tube connection seat 40, a light tube sliding support 51, a light tube 50, and a combination seat 60.

In accordance with the present invention, the housing 10 is a hollow tubular body and one end of the body is a pivotal section 101 having a diameter smaller than that of the housing 10. The inner circumferential edge wall of the pivotal section 101 is provided with a protruded peg 102, and a protruded semi-cylindrical shaped wire hole 103 is formed at an appropriate position on the circumferential edge surface of the housing 10 below the pivotal section 101. The interior of the housing 10 is provided with a seat body 20 made from a metallic material. The other end of the seat boy 10 has a circumferential edge being sealed with a base cap 11 having a binding hole 111.

The seat body 20 is used for the holding of the solenoid module 30 of the magnetic coil loop.

The solenoid module 30 includes a wired wheel 31 having a center hole 32 and the external edge thereof is surrounded with wires. The wire is pulled out from the wired wheel 31 with a section wire 311, and the hole 32 is mounted sequentially with a secured seat 33 having a recess at one end, a sliding rod 34 having a protruded conic protrusion and the external side of the end edge of the hole 32 is provided with a pad 35. On the pad 35, there is a notch and a small hole for the insertion of the wire 311. The surrounding of the sliding rod 34 is provided with an elastic body 36 and a blocking plate 37 is mounted opposite the protruded conic end. The blocking plate 37 has one end face forming into an engaging section 371 which can be combined with the light tube sliding support seat 51. The other end face urges at one end of the sliding rod 34 to provide blockage for the elastic body 36, and the conic end of the sliding rod 34 is in combination with the recess of the securing seat 33. Thus, when a current passes through the solenoid 30, a magnetic field effect is produced and the sliding rod 34 is attracted to move downward to adhere with the securing seat 33 to form as one unit, and when the magnetic field is lost, the restoration force of the elastic body 36 will push the sliding rod 34 upward.

The connection seat 40 has a hollow interior to provide mounting for a single light tube 50, the light tube sliding support seat 51, and a tube mounting 52. One end of the seat 40 is a circumferential edge face having a connection section 41 spaced with equally distributed protruded edge 411. The other end being circumferential edge face is provided with a connection section 42 having a L-shaped notch 421, and the notch 421 is served to hold the peg 102. The inner wall face of the notch 421 is provided with a rib 401.

The light tube sliding support seat 51 is a cylindrical body with its upper end connected to a light tube 50 via the tube mounting 52. The lower end of the seat 51 is connected to the blocking plate 37 so as to interconnect with the sliding rod 34 to form a synchronized interlink structure. The circumferential edge face of the tube body of the light tube 50 is provided with a sliding slot 511 for the engagement with the rib 401 at the inner wall of the connection seat 40 so that an up-down movement is obtained instead of a left-right movement.

The light tube 50 is a single light emission point and is combined with the light tube sliding support seat 51 to provide synchronized movement. From the light emission point, a high, and low position wire 501 are respectively extended, wherein when the wire 501 is located within the internal of the light tube 50, it denotes a positive current, and when the wire 501 is located at the external of the light tube 50 having an insulation tube 502, the current is insulated.

The combination seat 60 has a center through hole 61, wherein the circumferential edge is provided with a combination wing 62 of triangular shape, and the surface thereof is provided with a plurality of combination holes 63 for mounting with the connection seat 40 as a body. Thus, the combination seat 60 can be secured to the light bulb seat of the headlight of the car.

In accordance with the present invention, the operation and implementation of the high-low beam switching device are as follows:

The solenoid 30 and the seat body 20 are inserted from the bottom of the housing 10 and the connection seat 40, the light bulb 50 and the light tube sliding support seat 51, the sliding rod 34 and the elastic body 36 are inserted sequentially from the top of the housing 10, and the wire 311, high, low side wire 501 are extended and pass through the wire hole 103. After that, the combination seat 60 is covered thereto, as shown in FIG. 3.

Figure 4:
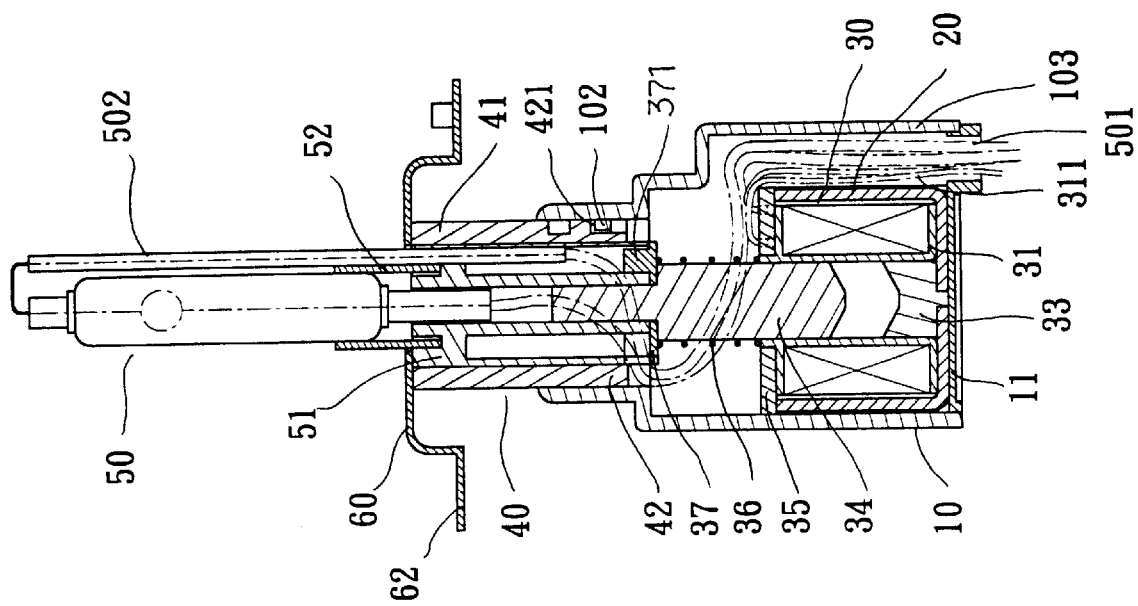
FIG. 4 is a sectional view of the present invention.
Figure 5:
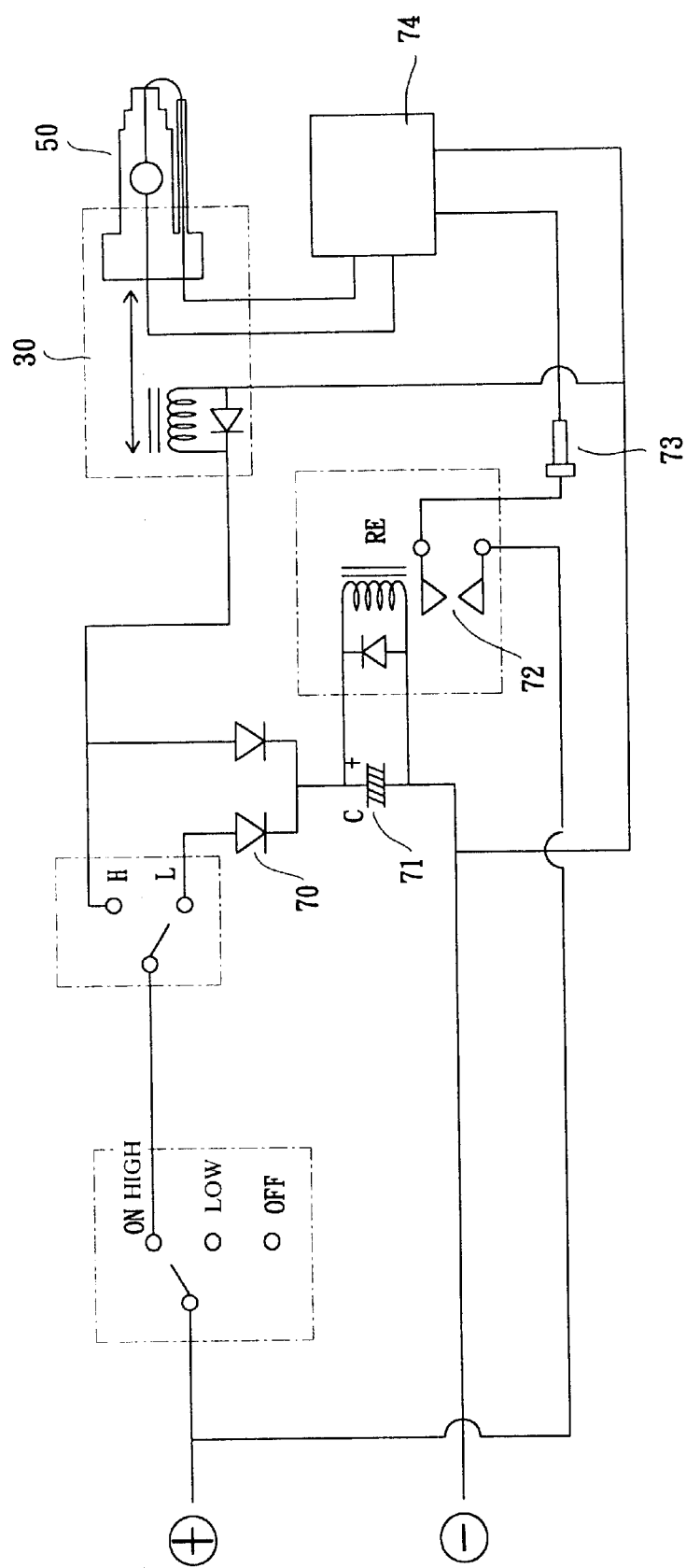
FIG. 5 is a circuit diagram of the high-low beam switching structure utilized in accordance with the present invention.
Figure 6:
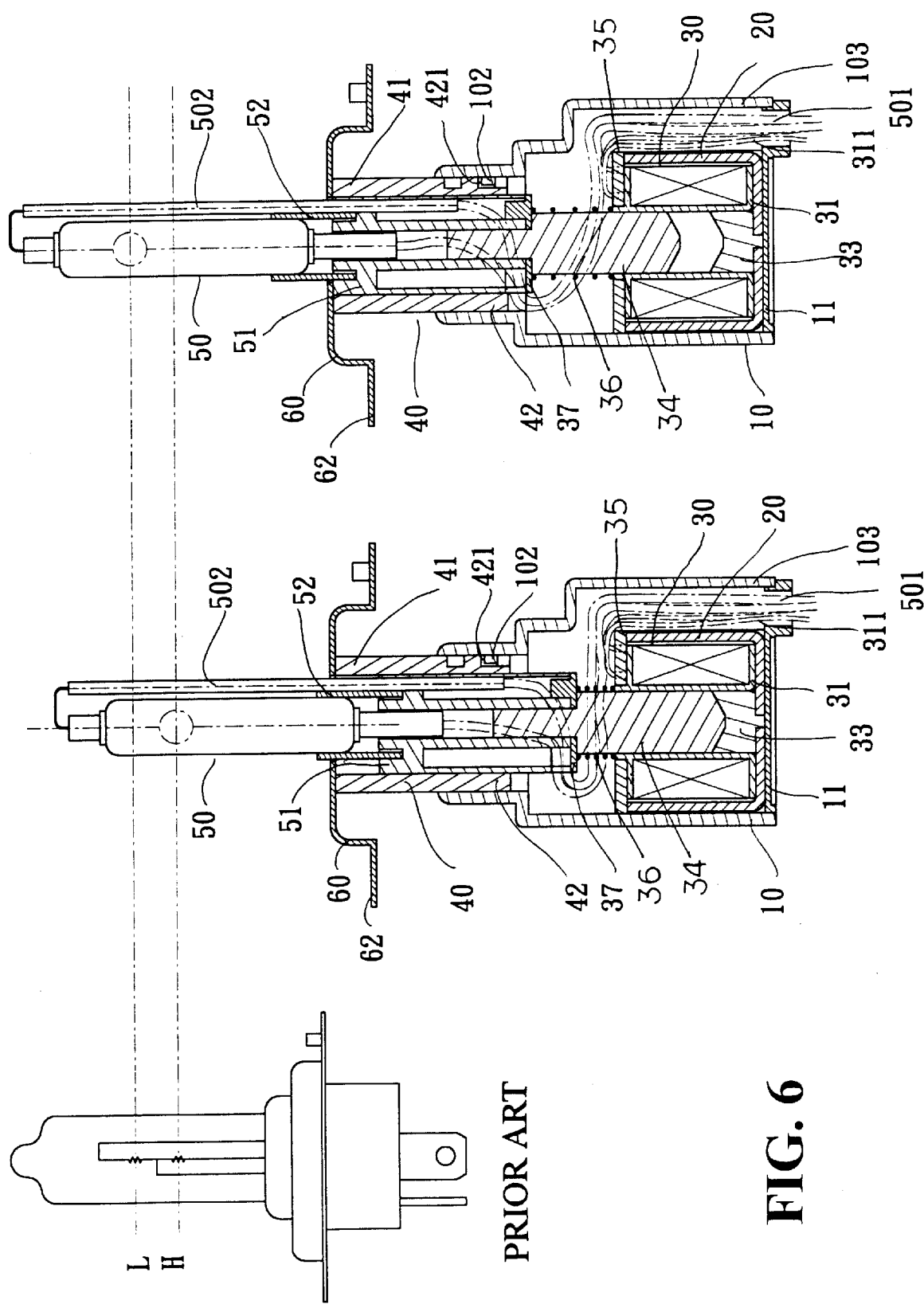
FIG. 6 is a schematic view showing the action of the switching device in accordance with the present invention.
Figure 7:
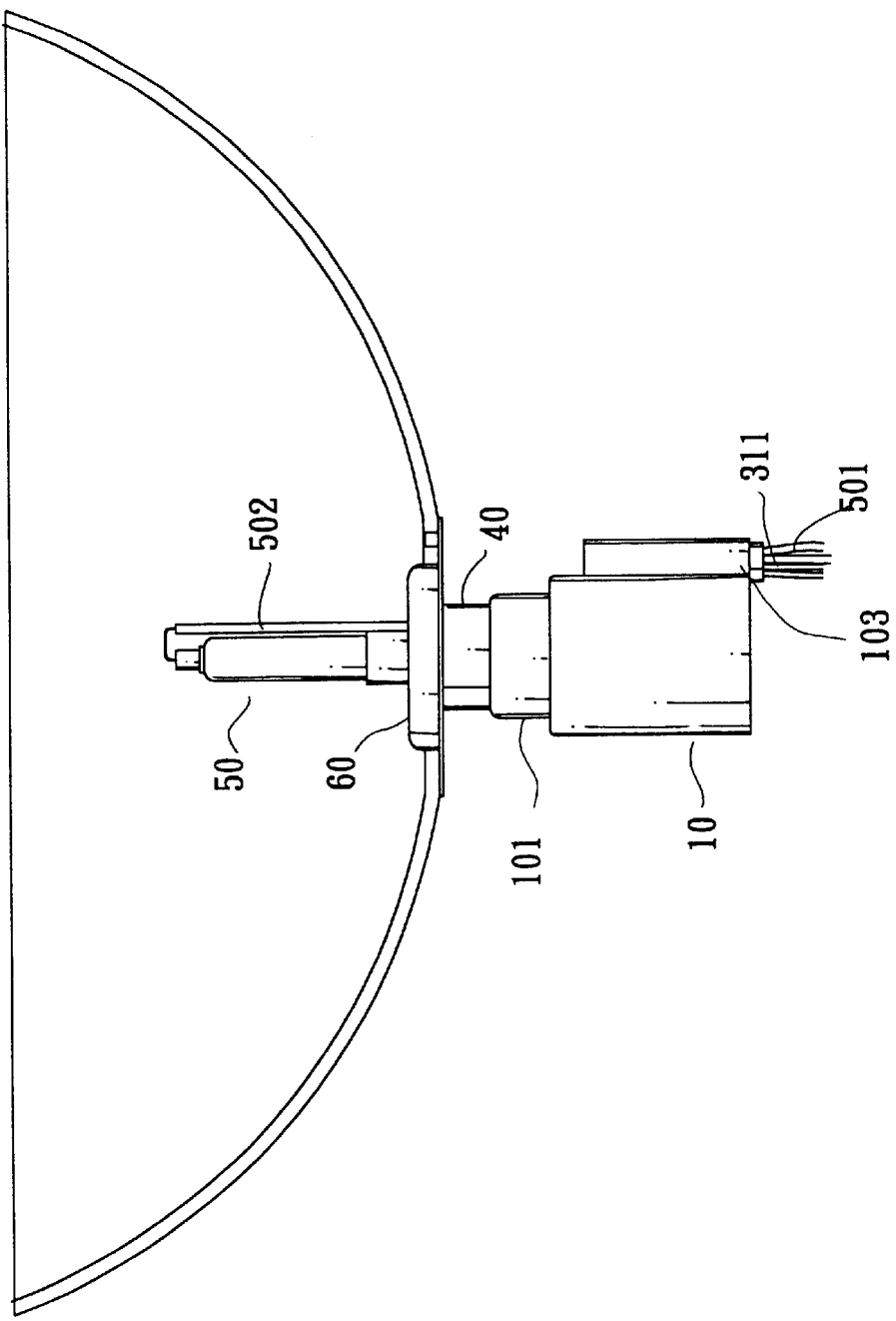
FIG. 7 is a schematic view illustrating the implementation of the switch device in accordance with the present invention.

In order to operate the switching device of the present invention, as shown in FIG. 4, the wire 311 of the solenoid module 30 and the high and low side lead wire 501 of the light tube 50 are connected to a power source, and the circuit of the connection is shown in FIG. 5. As shown in the figure, the circuit structure is alike the layout of the conventional circuit, with the addition of two diodes (D1, D2) 70, capacitor (C) 71, relay 72, fuse 73, stabilizer 74, wherein the capacitor (C) 71 is used for current storage, and has a function of delaying the relay 72 such that the current will not be cut off in the course of high-low beam switching. In accordance with the present invention, the solenoid module 30 is connected in between a switch connection point and the light tube 50. As shown in FIG. 6, when current passes through the solenoid module 30, a magnetic field effect is produced and the sliding rod 34 is attracted downward to the securing seat 33 to form as a unit, and the light tube sliding support seat 51 is driven together with the light tube 50 for a distance of 7 mm and the position of the light point of the light tube 50 is changed and the objective of focal distance change of high beam (H) is obtained. If the power source is switched off the solenoid module 30 will lost current supply and the magnetism is disappeared. At this instance, as a result of restoration force of the elastic body 36, the sliding rod 34 causes the entire light tube sliding support seat 51 and the light tube 50 to move forward to the low light (L) position.

In the preferred embodiment, the switching device is mounted onto the headlight of a car by employing a combination seat 60 having a plurality of combination wings 62 at the circumferential edge, and in combination with the light bulb seat as one unit. The change of high and low beam is obtained as described above.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A high-low beam switching device for a headlight comprising
    a housing having a pivotal section at one end and a semi-cylindrical wire hole at the surface of the lower edge circumferential surface, and having the other end being provided with a base cap seal having a wire-binding hole;
    a seat body for the engagement with a solenoid module of a magnetic coil loop; the solenoid module being a wired wheel having a center hole and the edge thereof being surrounded with wires, the interior of the center hole being a securing seat and a sliding rod, and the external side of the end edge being mounted with a pad, and the external of the sliding rod being provided with an elastic body, and a blocking plate being mounted onto a conic end;

a connection tube seat having a connection section at one end and an engaging section at the other end, and the inner wall therefore being a protruded rib;

a sliding light tube support being a circular body having a sliding slot provided around the circumferential edge thereof;

a light tube having a single light point therein, wherein a high and a low wire is extended from the light point; and a combination seat having a plurality of combination wing at the circumferential edge of the center through hole thereof; and wherein the surface of the wing is provided with a plurality of combination holes to secure with the light bulb seat for car, thereby the solenoid module produces a magnetic field effect to attract the sliding rod and the securing seat to form as one unit and the sliding tube seat drives the light tube to move backward a distance of 7 mm, and when there is no magnetic field, the elastic body causes the sliding tube seat and the light tube to restore to the original position, therefore, the focus of the single light point is changed to achieve the switching of a high-low beam of the headlight.

2. The switching device of claim 1, wherein the circular wall of the circumferential edge at the internal of the pivotal sectional of the housing is provided with a protruded peg.

3. The switching device of claim 1, wherein the securing seat of the through hole of the solenoid module has one end being a recess and is corresponding to the protrusion of the sliding rod.

4. The switching device of claim 1, wherein the blocking plate has one end face being an engagement section for mounting with the bottom section of the light tube sliding support seat, and having another end being urged at one end of the sliding rod to provide blockage to the elastic body.

* * * * *